US007163631B1

(12) United States Patent
You et al.

(10) Patent No.: US 7,163,631 B1
(45) Date of Patent: Jan. 16, 2007

(54) PROCESS FOR TREATING WASTEWATER CONTAINING PERACETIC ACID

(75) Inventors: Huey-Song You, Hsinchu (TW); Shan-Shan Chou, Hsinchu (TW); Sheng-Hsin Chang, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 11/318,612

(22) Filed: Dec. 28, 2005

(30) Foreign Application Priority Data

Sep. 19, 2005 (TW) .............................. 94132326 A

(51) Int. Cl.
*C02F 3/00* (2006.01)

(52) U.S. Cl. ...................... 210/620; 210/767; 210/263; 210/621; 210/622; 210/623; 210/220

(58) Field of Classification Search ................ 210/620, 210/767, 263, 621–623, 220
See application file for complete search history.

(56) References Cited

U.S. PATENT DOCUMENTS 4,011,156 A * 3/1977 Dubach et al. ............. 210/621
2005/0131086 A1* 6/2005 Kohler et al. ............... 518/726

FOREIGN PATENT DOCUMENTS

JP 2003292996 A * 10/2003

* cited by examiner

*Primary Examiner*—Chester T. Barry
(74) *Attorney, Agent, or Firm*—Bacon & Thomas PLLC

(57) ABSTRACT

The present invention disclose a process for treating a wastewater from a foodstuff factory, wherein the pipelines are cleaned and the containers are sterilized by using a water containing peracetic acid as an disinfection agent. The process of the present invention includes aerating or stirring the wastewater to decompose the peracetic acid contained therein, and carrying out an aerobic treatment to decompose the organic compounds in the wastewater. Peracetic acid is in the unstable peroxidation state, and can be decomposed into acetic acid by self-oxidation-reduction. The process of the present invention uses aeration or stirring to trigger the decomposition of the peracetic acid, so that the disinfection function thereof is reduced, and thus the aerobic treatment can be conducted to decompose the organic compounds in the wastewater.

9 Claims, 3 Drawing Sheets

PROCESS FOR TREATING WASTEWATER CONTAINING PERACETIC ACID

FIELD OF THE INVENTION

The present invention relates to a technique in treating wastewater containing disinfection agent (bactericide), particularly a technique in treating wastewater containing peracetic acid as a bactericide.

BACKGROUND OF THE INVENTION

In the past, sodium hypochlorite was used as a bactericide in the sterilization of pipelines and containers in a food plant. In recent years, the trend is using peracetic acid as a bactericide. Conventionally, wastewater generated from sterilization using sodium hypochlorite and the rinse water thereafter were mixed and treated together with wastewater from other process, due to a high concentration of ions contained in the wastewater from sterilization.

Peracetic acid is produced according to the following formula:

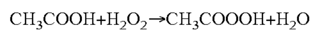

$$CH_3COOH+H_2O_2 \rightarrow CH_3COOOH+H_2O$$

Therefore, main ingredients of a peracetic acid bactericide include acetic acid (35%), peracetic acid (15%), hydrogen peroxide (25%), and the balance water (25%), wherein peracetic acid is the main bactericide. When a peracetic acid bactericide is used in washing pipelines and containers in a food plant, soft water is used to prepare the bactericide with a desired concentration. The wastewater generated thereafter generally is deemed as unable of being effectively treated individually due to a high concentration of bactericide contained in the wastewater. Therefore, such wastewater is mixed with wastewater from other processes and then transported to a general treatment plant.

SUMMARY OF THE INVENTION

The present invention provides a method for treating wastewater containing peracetic acid, which comprises the following steps:

a) aerating or mechanical agitating wastewater containing peracetic acid to decompose the peracetic acid contained therein;

b) carrying out an aerobic treatment in the resulting water from step a) having a reduced content of peracetic acid to decompose organic compounds therein; and c) recovering the treated water from step b) as reusable water, when said aerobic treatment is carried out by using attached sludge; or subjecting the treated water from step b) to a solid-liquid separation to obtain reusable water having a reduced suspension solid content therein, when said aerobic treatment is carried out by using a suspended biological sludge, wherein said reusable water can be recycled or discharged.

Preferably, the reusable water from step c) is further introduced to a sand filtration tower for filtration, and the filtered water is introduced to a cooling tower as a cooling water.

Preferably, the solid-liquid separation in step c) is selected from the group consisting of precipitation, flotation removal, membrane filtration, and a combination thereof.

Preferably, step a) comprises carrying out said aeration with air until the aerated water has a content of peracetic acid therein being reduced to a degree suitable for carrying out said aerobic treatment in step b). More preferably, said air aeration is carried out in an aeration tank with a hydraulic retention time of 0.1–1.0 hour, and an air aeration rate of 10.0 to 1000 liters per minute and per cubic meter of said aeration tank.

Preferably, the method of the present invention further comprises recycling a portion of the treated water from step b) to join said wastewater containing peracetic acid to be subjected to said aeration or mechanical agitation in step a).

Preferably, the method of the present invention further comprises recycling a portion of the reusable water from step c) to join said wastewater containing peracetic acid to be subjected to said aeration or mechanical agitation in step a).

Preferably, the method of the present invention further comprises recycling the resulting sludge from said solid-liquid separation in step c) to be used as a portion of a source of the microorganism required by the aerobic treatment in step b).

Preferably, said wastewater containing peracetic acid to be treated by the method of the present invention is a wastewater generated from washing pipelines or containers in a food plant.

LEGENDS

Figure 1:
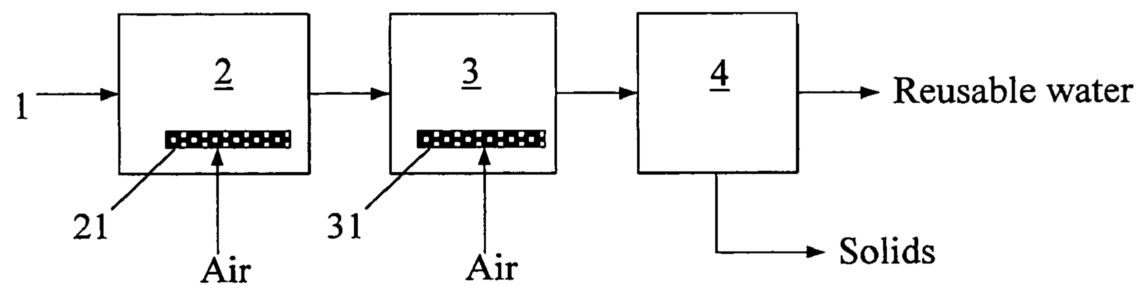
FIG. 1 shows a schematic block diagram of a system for treating wastewater containing peracetic acid according to an embodiment of the present invention.

1. raw wastewater
2. aeration tank
3. aerobic reaction tank
4. solid-liquid separation tank
5. blower
21, 31. aeration unit

DETAILED DESCRIPTION OF THE INVENTION

According to a view from the inventors of the present invention, wastewater generated from washing pipelines and sterilizing containers with a peracetic acid bactericide in a food plant will increase the hydraulic load of a general treatment plant, due to a low concentration of organic pollutants contained in the wastewater. Furthermore, when the wastewater flowrate from other processes reduces, the dilution of the bactericide wastewater will be decreased. As a result, the bactericide wastewater still has biological inhibition function, and this will cause an unstable performance in the general treatment plant. Furthermore, a peracetic acid bactericide is prepared by using soft water, which is worthy to be recovered and reused.

The redox potential of peracetic acid is 1.81 eV (electron Volts), and peracetic acid has disinfection function due to its strong oxidation power. However, peracetic acid is a peroxide and is unstable per se. Therefore, in order to destroy its oxidation power, a reducing agent is needed to undergo a redox reaction. In an ordinary water treatment, a sulfur-containing reducing agent is commonly used (e.g. sodium thiosulfate or sodium sulfite). However, when a sulfur-containing reducing agent is used in water treatment, not only the chemical agent will increase the operation cost, but also sulfate ions will be generated after the redox reaction, which causes a secondary pollution. In addition, the water quality will be jeopardized by chemical residues, when an excessive amount of chemicals is used.

The present invention is accomplished by using the characteristics of peracetic acid, which is a peroxide oxidant and is unstable. Contaminants including organic compounds exist in the wastewater from washing and/or sterilizing operations by using an aqueous solution of peracetic acid as a bactericide. Therefore, the contaminants and peracetic acid can undergo redox reaction, if sufficient contact thereof is provided by an adequate mixing, thereby resulting an effective auto-redox reaction in the wastewater. A portion of a microorganisms-containing effluent from a downstream aerobic treatment may be recycled and introduced to the wastewater, if the amount of contaminants is not sufficient. As a result, peracetic acid is decomposed to acetic acid, and the disinfection power of peracetic acid is diminished. A mechanical agitation can be used in the present invention to provide the mixing for the auto-redox reaction in the wastewater. The present invention uses a blower in the downstream aerobic treatment, so that aeration with air or other gas, preferably air, is also can be used to provide the mixing for the auto-redox reaction in the wastewater.

According to a preferred embodiment of the present invention, a peracetic acid wastewater treatment system is shown in FIG. 1 and includes:

an aeration tank 2 adapted to receive peracetic acid wastewater 1 and having an aeration unit 21, wherein pollutants in the wastewater and peracetic acid contact with each other by the mixing of air aeration during residence of said peracetic acid wastewater 1 in said aeration tank 2, inducing an auto-redox reaction, thereby decomposing the peracetic acid to acetic acid to prevent from the inhibition of peracetic acid on microorganisms;

an aerobic reaction tank 3 having an aeration unit 31 in the interior thereof, said aerobic reaction tank 3 being connected to said aeration tank 2 and receiving an effluent from said aeration tank 2, wherein at least a portion of the organic pollutants contained in said effluent is removed through an aerobic microorganism treatment in the tank 3; and a solid-liquid separation tank 4 connected to the aerobic reaction tank 3 and receiving the effluent of the aerobic reaction tank 3 for separating the liquid phase and the solid phase of the effluent of the aerobic reaction tank to obtain reusable water and solid part or sludge separately.

The above-mentioned aerobic reaction tank 3, when in use, needs to be implanted with an aerobic sludge in advance. When the aerobic reaction tank 3 is implanted with a suspended aerobic sludge, the solid-liquid separation tank 4 further includes a device (not shown) for recycling the sludge generated by the solid-liquid separation to the aerobic reaction tank 3 in order to maintain a stable quantity of microorganism in the aerobic reaction tank 3.

When the attached aerobic sludge is implanted in the aerobic reaction tank 3, the solid-liquid separation tank can further include a device (not shown) for discharging the solids generated by the solid-liquid separation out of the treatment system.

The present invention can be further understood by the following example, which is for illustrative purpose only and not for limiting the scope of the present invention.

EXAMPLE 1

Figure 2:
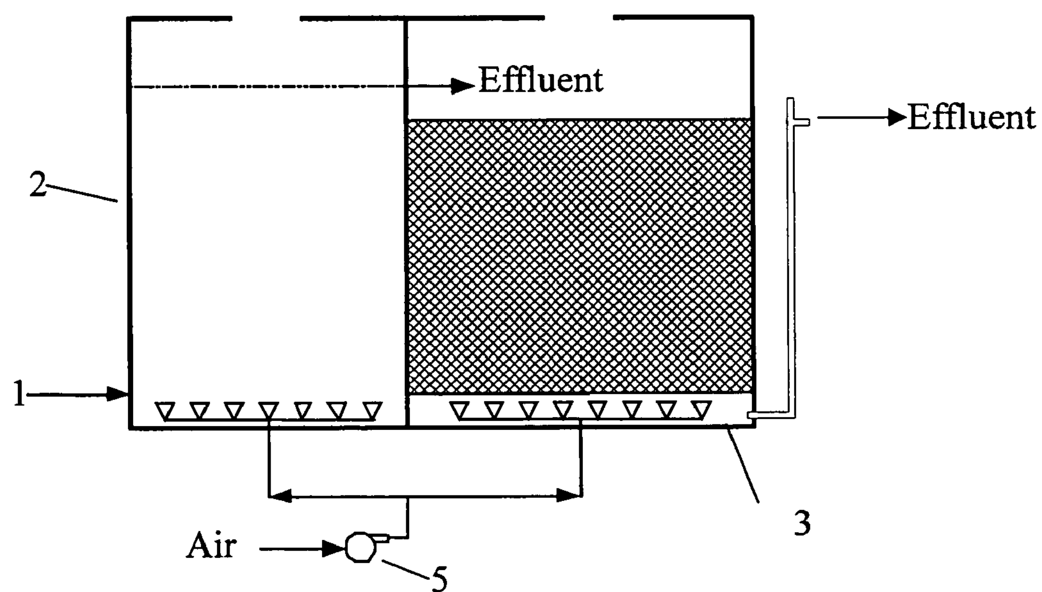
FIG. 2 shows a schematic cross-sectional view of a system for treating wastewater containing peracetic acid according to another embodiment of the present invention.

This example used a system of the present invention as shown in FIG. 2, including an aeration tank 2 receiving a raw wastewater 1, and an aerobic reaction tank 3. The aerobic reaction tank 3 in this example used an attached sludge, and thus the discharged water from the aerobic reaction tank 3 would contain only a small quantity of sludge. In this example, the aeration tank 2 and the aerobic reaction tank 3 were formed by dividing a single large tank. The total effective volume of said single large tank was 54 $m^3$, the effective volume of the aeration tank 2 was 10 $m^3$, and the effective volume of the aerobic reaction tank 3 was 44 $m^3$, wherein the water discharged from the aeration tank 2 overflowed to the aerobic reaction tank 3 by a difference in water levels, and a blower 5 was used to aerate the wastewater in the aeration tank 2 and the aerobic reaction tank 3. The wastewater from a food plant making tea beverages was treated in this example, wherein a bactericide containing peracetic acid was used to sterilize PET bottles. The properties of the raw wastewater are shown in Table 1 and FIGS. 3 and 4. The amount of the wastewater treated was 500 $m^3$ per day. The hydraulic retention time (HRT) of the wastewater in the aeration tank 2 was about 0.5 hour, and the aeration rate therein per unit volume of the aeration tank per unit time was 15 $L/m^3$-min. The HRT of the aerobic reaction tank 3 was about 2 hours, wherein the air aeration rate was 1.7 $Nm^3$/min. Aerobic sludge was seeded in the aerobic reaction tank 3 in advance.

TABLE 1

Quality of Wastewater Containing Peracetic Acid Bactericide

| Item | pH | COD (mg/L) | Consumption of Reducing Agent (mg/L) |
|---|---|---|---|
| Raw Wastewater | 4.2–5.2 | 140–330 | 440–530 |

Figure 3:
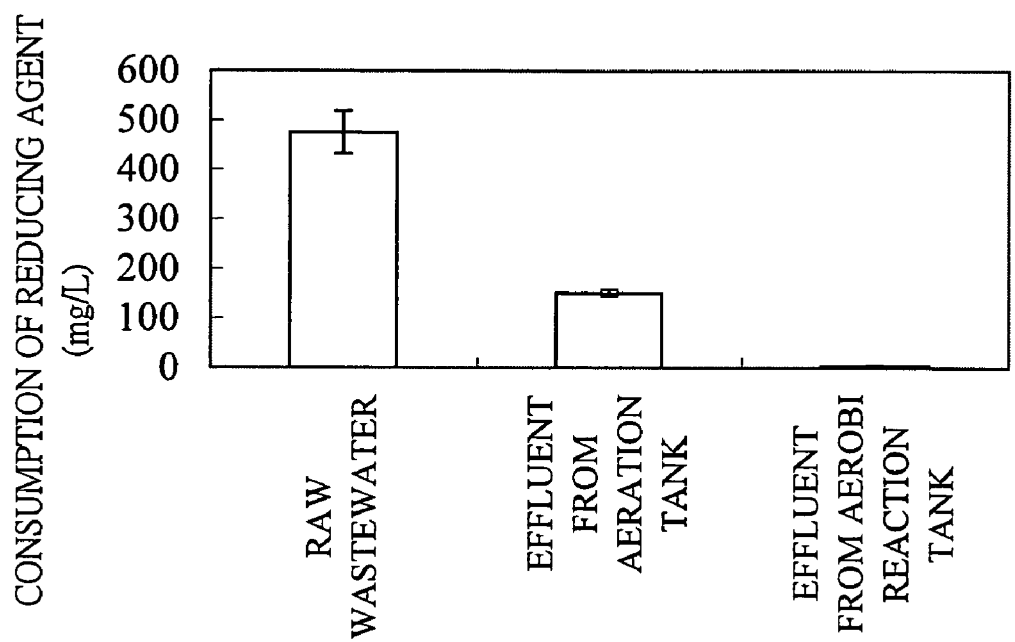
FIG. 3 shows the variations of the redox power of raw wastewater, effluent from the aeration tank, and effluent from the aerobic reaction tank according to Example 1 of the present invention.
Figure 4:
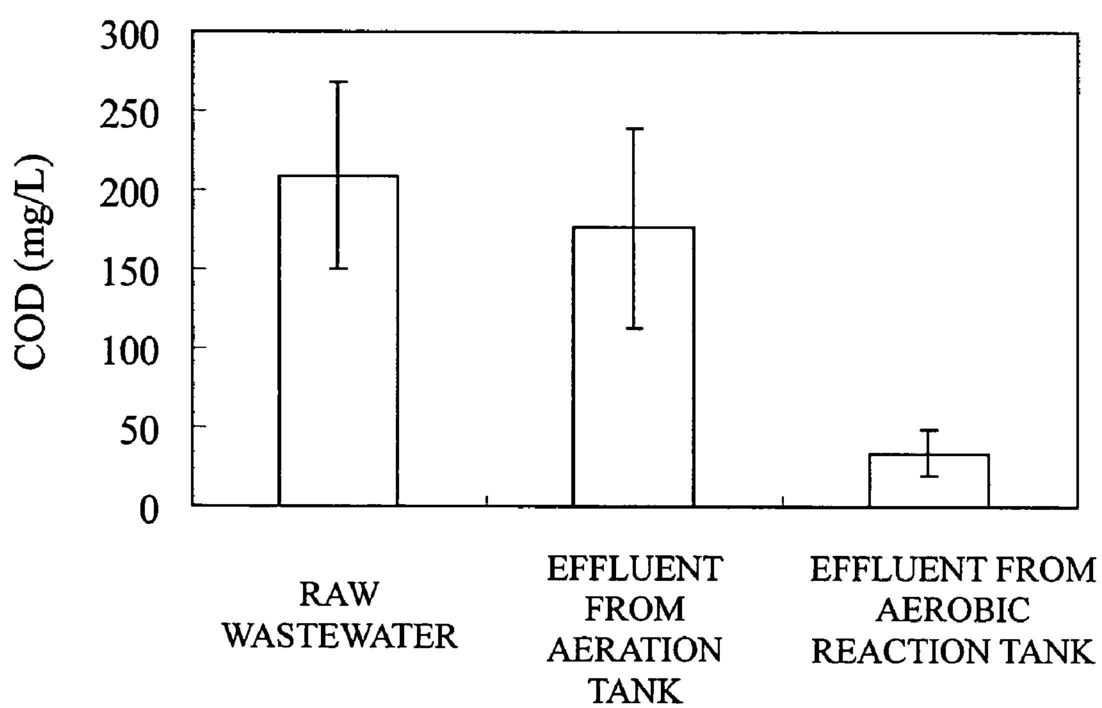
FIG. 4 shows the variations of the COD concentrations of raw wastewater, effluent from the aeration tank, and effluent from the aerobic reaction tank according to Example 1 of the present invention.
Figure 5:
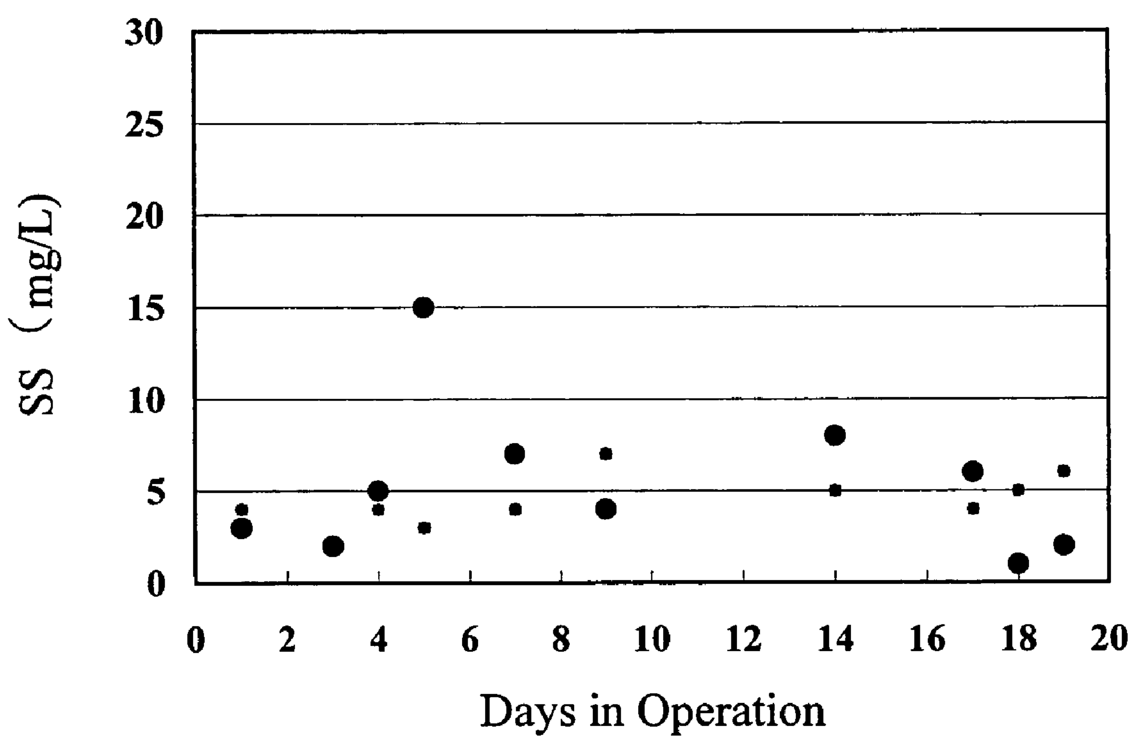
FIG. 5 shows the variations of the suspension solids (SS) concentrations of the effluent from the aeration tank (represented by circles) and effluent from the aerobic reaction tank (represented by squares).

After two months of trial running, the redox power of raw wastewater, effluent from the aeration tank 2, and effluent from the aerobic reaction tank 3 were measured by titration with sodium thiosulfate ($Na_2S_2O_3$) as a reduction agent and potassium iodide (KI) as an indicator. The results are shown in FIG. 3. The consumption of the reduction agent of raw wastewater was 475±43 mg/L. After aeration with HRT of 30 minutes, the consumption of the reduction agent is reduced to 151±7 mg/L. After aeration with HRT of 2.5 hours, the consumption of the reduction agent is further reduced to 4±2 mg/L. The data shown in FIG. 3 indicate that the air aeration in the tank 2 can effectively reduce the oxidation power of the oxidation agent in wastewater and thus its inhibition on the biodegradation. FIG. 4 show the variations of COD concentrations of raw wastewater, effluent from the aeration tank 2, and effluent from the aerobic reaction tank 3, wherein the COD concentrations of raw wastewater, effluent from the aeration tank 2, and effluent of the aerobic reaction tank 3 are 209±59, 176±63 and 34±14 mg/L, respectively. The results indicate that the bactericide wastewater containing peracetic acid, after aeration to remove the disinfection function of peracetic acid, can be effectively treated by biodegradation. The variations of the suspension solids (SS) concentration of the effluent from the aeration tank 2 and the effluent from the aerobic reaction tank 3 are shown in FIG. 5. It can be seen from FIG. 5 that the SS concentration of the effluent from the aeration tank 2 is within 1–15 mg/L, and the SS concentration of the effluent from the aerobic reaction tank 3 is within 2–7 mg/L. The results meet the standards of wastewater discharge. The treated water, after a simple sand filtration to remove SS and disinfection, can be recycled to a cooling tower as replenishing water.

The invention claimed is:

1. A method for treating wastewater containing peracetic acid, which comprises the following steps:

a. aerating or mechanically agitating wastewater containing peracetic acid in a tank without an addition of sludge to decompose the peracetic acid contained therein, wherein said wastewater containing peracetic acid is a wastewater generated from washing pipelines or containers in a food plant;

b. carrying out an aerobic treatment in the resulting water from step a) having a reduced content of peracetic acid to decompose organic compounds therein; and c. recovering the treated water from step b) as reusable water, when said aerobic treatment is carried out by using attached sludge; or subjecting the treated water from step b) to a solid-liquid separation to obtain reusable water having a reduced suspension solid content therein, when said aerobic treatment is carried out by using a suspended biological sludge, wherein said reusable water can be recycled or discharged.

2. The method as claimed in claim 1, wherein the reusable water from step c) is further introduced to a sand filtration tower for filtration, and the filtered water is introduced to a cooling tower as a cooling water.

3. The method as claimed in claim 1, wherein the solid-liquid separation in step c) is selected from the group consisting of precipitation, flotation removal, membrane filtration, and a combination thereof.

4. The method as claimed in claim 1, wherein step a) comprises carrying out said aeration with air until the aerated water has a content of peracetic acid therein being reduced to a degree suitable for carrying out said aerobic treatment in step b).

5. The method as claimed in claim 1 further comprising recycling a portion of the treated water from step b) to join said wastewater containing peracetic acid to be subjected to said aeration or mechanical agitation in step a).

6. The method as claimed in claim 1 further comprising recycling a portion of the reusable water from step c) to join said wastewater containing peracetic acid to be subjected to said aeration or mechanical agitation in step a).

7. The method as claimed in claim 1 further comprising recycling the resulting sludge from said solid-liquid separation in step c) to be used as a portion of a source of the microorganism required by the aerobic treatment in step b).

8. The method as claimed in claim 4, wherein said air aeration is carried out in an aeration tank with a hydraulic retention time of 0.1–1.0 hour, and an air aeration rate of 10.0 to 1000 liters per minute and per cubic meter of said aeration tank.

9. The method as claimed in claim 1, wherein the resulting water from step a) having a reduced content of peracetic acid is subjected to the aerobic treatment in step b) directly.

* * * * *